Figure 1:
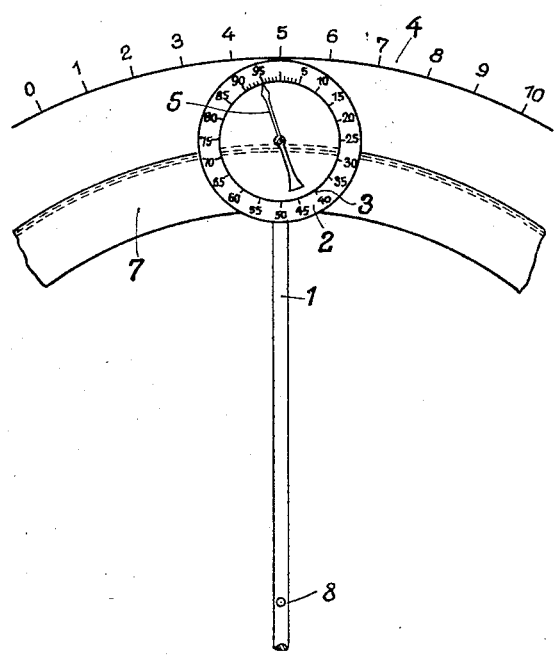

May 10, 1932.  G. RAASCHE  1,857,870

INDICATING DEVICE FOR AUTOMATIC BALANCES

Filed Aug. 9, 1930

Inventor:
Gerhard Raasche,

Patented May 10, 1932

1,857,870

UNITED STATES PATENT OFFICE

GERHARD RAASCHE, OF RIGA, LATVIA, ASSIGNOR TO FIRM PAUL RAASCHE SÖHNE, OF RIGA, LATVIA, A COMPANY OF LATVIA

INDICATING DEVICE FOR AUTOMATIC BALANCES

Application filed August 9, 1930, Serial No. 474,252, and in Latvia August 15, 1929.

The present invention relates to an indicating device for automatic balances, which requires little space and thus permits the production of balances of smaller size, accurate reading of both the large and small units of weight, and the exclusion of errors in adding small units of weights to larger ones.

It has been proposed already to immovably arrange the scale plate and the pointer for the small units of weight, which moves over the scale, at a certain point of the balance and to bring the pinion on the axis of the pointer for the small units of weight into engagement with a toothed segment disposed on the deflection indicator for the large units of weight and adapted to oscillate with the latter. The deflection indicator carries in this case also a special mark moving over the arcuate scale of the large units of weight.

It has been found that the known device suffers from the drawback that errors may arise during the addition of the small units of weight to the large ones if the mark indicating the large units has almost, but not fully, reached a graduation. It frequently happens in such cases that the small units are erroneously added to the large unit not fully reached instead of to the preceding one. This is due to the fact that the two scales do not appear to the human eye to be intrinsically connected and are furthermore too far apart, so that the two pointers and scales yield two optically separated images which can be connected only by a mental process. Moreover, the toothed segment cooperating in the motion of the deflection indicator needs much space with the result that the total space required by the balance is disproportionally large.

The invention eliminates these drawbacks found in the known devices by arranging the scale plate with the division for the small units of weight and the pointer rotatable over the scale plate on the deflection indicator, the axis of the pointer for the small units carrying a pinion engaging a stationary toothed segment on the balance. The zero mark of the scale plate secured to the deflection indicator, or its extension, serves further for indicating the large units of weights on the arcuate scale whereby reading is facilitated, as the reading points for the large and small units of weight are always spaced the same distance relative to one another. If the zero mark of the scale plate, or its extension, is simultaneously used for indicating the large units of weight, errors in reading are prevented still more, for the reading person, owing to the close connection between the main and auxiliary scale established by the zero mark serving simultaneously as pointer, can immediately and without thinking recognize by looking at the pointer for the small units, in a similar manner as on the large hand of a clock, that the next graduation of the main scale has not been reached yet.

Furthermore, the balance according to the invention can be of a much more compact build, as the space required for the moving toothed segment in the known balances is dispensed with.

Figure 2:
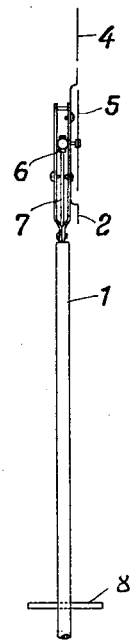

By way of example, one form of the invention is illustrated in the accompanying drawings, in which Figure 1 is a front view of the reading device and Fig. 2, a vertical section thereof.

Referring to the drawings: To the deflection indicator 1 the scale plate 2 is secured bearing the circular scale 3 for the small units of weight. The zero mark of the scale 3 moves during deflections of the indicator 1 over the arcuate scale 4 for the large units of weight, which is firmly secured to the balance, and thus indicates the deflection of the balance. In the center of the scale plate 2 on the deflection indicator 1 the axis of the rotary pointer 5 for the small units of weight is rotatably disposed and connected with the gear 6 engaging the toothed segment 7 firmly secured to the balance and rotating thereon during deflections of the indicator 1. The lever of the deflection indicator 1 is arranged at 8 and moved by means not shown.

As Fig. 1 shows, the scale plate 2 and the scale 4 form at each deflection a closed unit that can be readily perceived. Even a person knowing nothing at all about automatic balances will be able to find out by a glance at Fig. 1 of the drawings that the deflection chosen by way of example indicates a value of 4.95, without having to do much thinking.

The pointer moving over the scale for the small units may have two or more points, in which case the scale plate is divided accordingly, each division corresponding to a large unit of weight, and only one division bearing the scale.

I claim:—

1. An indicating device for automatic balances, comprising a deflection indicator for the large units of weight carrying out a uniform arc-like motion below an equidistantly divided arcuate scale, a scale plate attached to the said deflection indicator and stating the interjacent small units of weight, a pointer adapted to rotate over the said scale plate, a gear connected with the said pointer, and a stationary toothed segment, the said gear rolling over the said segment during the motion of the said deflection indicator.

2. An indicating device for automatic balances, comprising a deflection indicator for the large units of weight carrying out a uniform arc-like motion below an equidistantly divided arcuate scale, a scale plate attached to the said deflection indicator and stating the interjacent small units of weight, a pointer adapted to rotate over the said scale plate, a gear connected with the said pointer, a stationary toothed segment, the said gear rolling over the said segment during the motion of the said deflection indicator, the zero mark of the scale plate on the deflection indicator serving simultaneously for indicating the large units.

In testimony whereof I affix my signature.

GERHARD RAASCHE.